(No Model.) 3 Sheets—Sheet 1.
H. A. F. PETERSEN.
UNDERGROUND CONDUIT FOR ELECTRIC RAILWAYS.
No. 546,389. Patented Sept. 17, 1895.
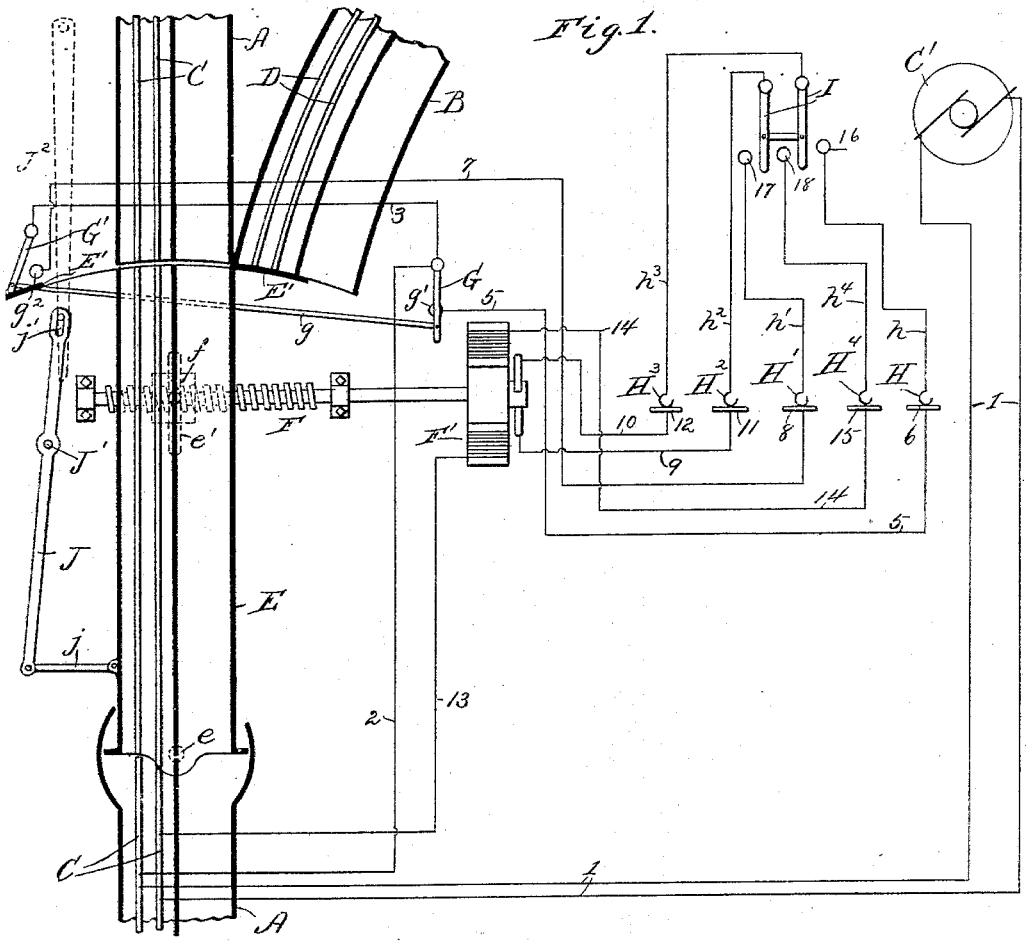
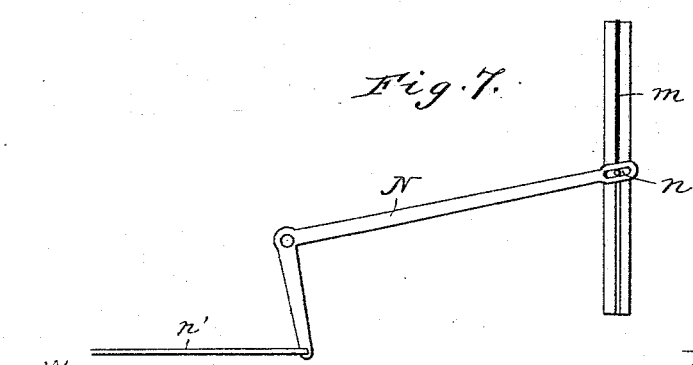
WITNESSES,
M. M. Wiles.
J. Lamberger Jr.
INVENTOR,
Herluf A. F. Petersen,
By John E. Wiles,
ATTORNEY.

(No Model.) 3 Sheets—Sheet 2.
H. A. F. PETERSEN.
UNDERGROUND CONDUIT FOR ELECTRIC RAILWAYS.
No. 546,389. Patented Sept. 17, 1895.
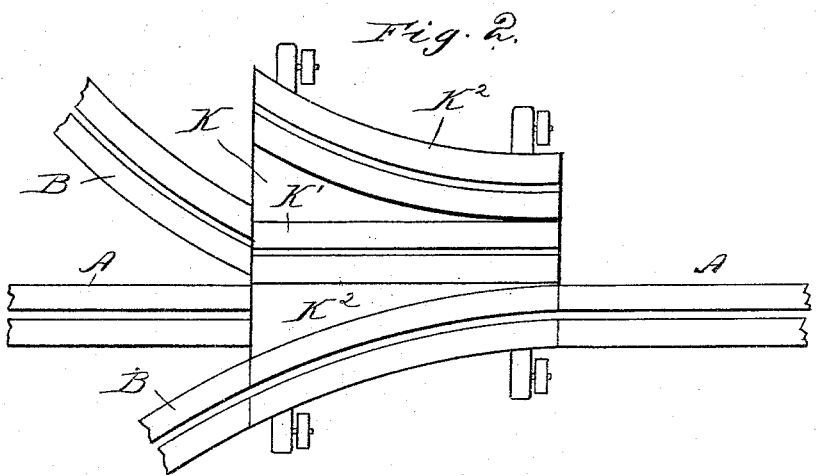
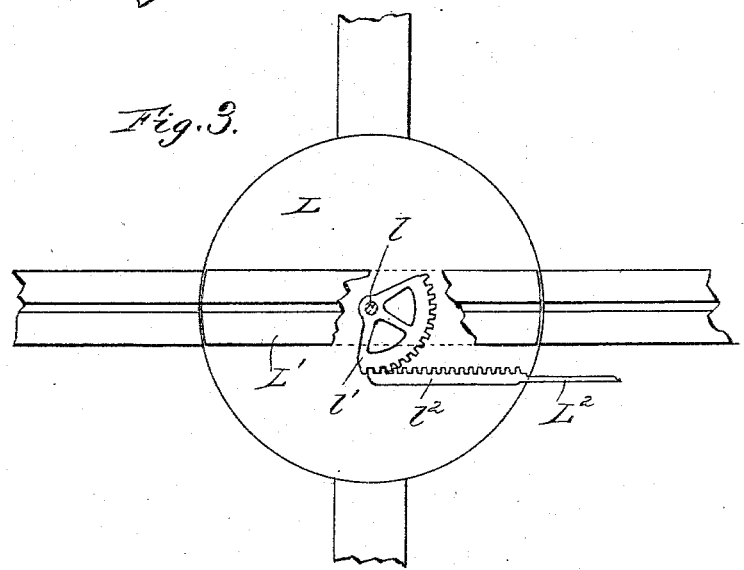
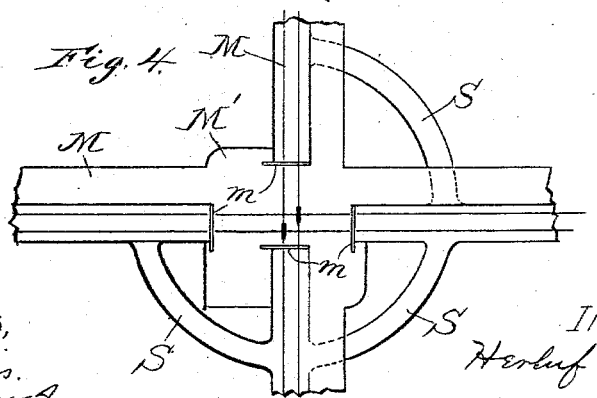
WITNESSES,
M. M. Wiles.
J. Lunsberg Jr.
INVENTOR,
Herluf A. F. Petersen,
By John E. Wiles,
ATTORNEY.

(No Model.) 3 Sheets—Sheet 3.
H. A. F. PETERSEN.
UNDERGROUND CONDUIT FOR ELECTRIC RAILWAYS.
No. 546,389. Patented Sept. 17, 1895.
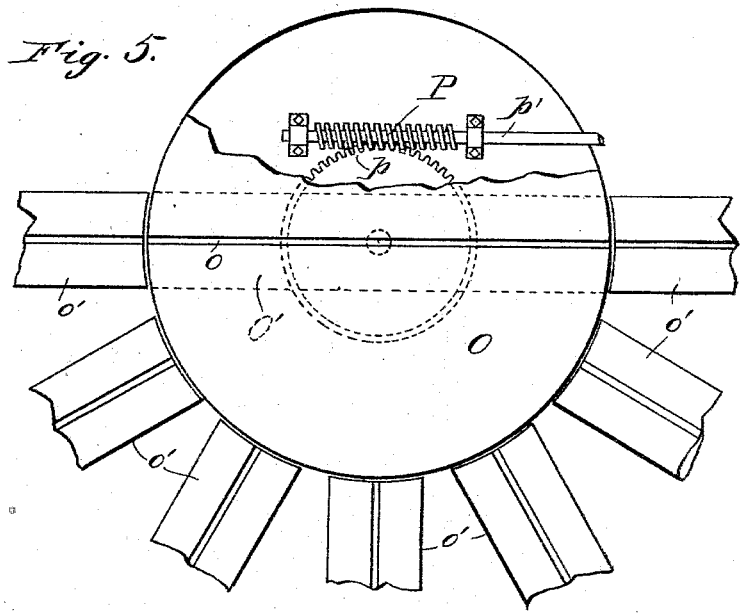
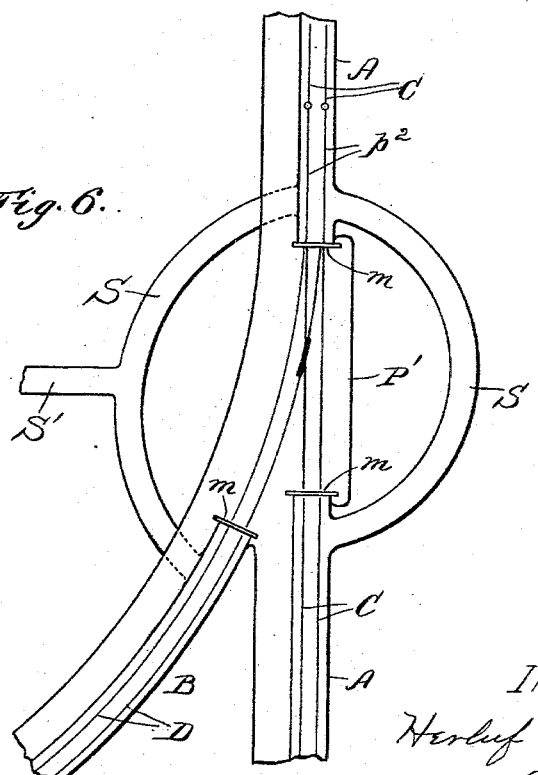
WITNESSES,
M. M. Wiles.
J. Lewnberger Jr.
INVENTOR,
Herluf A. F. Petersen.
By John E. Wiles,
ATTORNEY.

UNITED STATES PATENT OFFICE.

HERLUF A. F. PETERSEN, OF MILWAUKEE, WISCONSIN.

UNDERGROUND CONDUIT FOR ELECTRIC RAILWAYS.

SPECIFICATION forming part of Letters Patent No. 546,389, dated September 17, 1895.

Application filed March 19, 1894. Serial No. 504,248. (No model.)

*To all whom it may concern:*

Be it known that I, HERLUF A. F. PETERSEN, a citizen of the United States, residing at Milwaukee, county of Milwaukee, State of Wisconsin, have invented a certain new and useful Improvement in Underground Conduits for Electric Railways; and I declare the following to be a full, clear, and exact description of the invention, such as will enable others skilled in the art to which it pertains to make and use the same, reference being had to the accompanying drawings, which form a part of this specification.

My invention relates to new and useful improvements in underground conduits for electric railways, and relates more particularly to the construction of devices whereby a movable section of the conduit, together with movable sections of the conductors therein, may be readily adjusted, so as to enable the contact devices carried by a car to pass freely through said movable section of the conduit and into engagement with branch conduits leading in different directions from the main line.

In the accompanying drawings, illustrating my invention, Figure 1 is a diagrammatic view illustrating one form of my improved apparatus as designed for operation electrically and controlled by an electric switch upon a car. Fig. 2 is a diagrammatic plan view illustrating a different form of construction. Fig. 3 is a similar view illustrating another form of my improvement. Fig. 4 is a similar view illustrating still another form of my improved device. Fig. 5 is a similar view illustrating my improvement as applied to a turn-table in connection with a number of branch tracks. Fig. 6 illustrates still another form of my device. Fig. 7 illustrates one form of lever mechanism for actuating the sliding closing devices at the ends of the conduit.

In said drawings, A designates the conduit which extends along the main line of the track, and B a branch conduit communicating with the main conduit A and arranged to extend beneath a branch or side track.

C C designate the conductors in the main conduit, and D D the conductors in the branch conduit. In the particular form of construction shown in Fig. 1 I have illustrated the device as comprising a movable section E of the conduit, which section is pivotally supported at *e* and is arranged to be swung laterally upon its pivotal support, so as to come into register with the continuation of the main conduit A or with the branch conduit B, and this movable section E carries short sections of the conductors, as shown, which are arranged to permanently register at one end with the conductors in the main conduit and to be moved at their other ends alternately into register with the conductors in the continuation of said main conduit and the conductors in the branch conduit, so as to enable contact devices carried by the car to pass along the conductors either into the continuation of the main conduit or into the side or branch conduit, according to the direction of movement of the movable section E.

As shown in Fig. 1, I provide an electrically-actuated adjusting device for shifting the position of the movable section E, this device including a screw F, arranged to engage with a nut upon the under side of the movable section E, which nut *f* is preferably pivoted to said movable section E in a familiar manner, the connecting-block which serves to secure the nut *f* and the section E together being arranged to move in a longitudinal slot *e'* in the bottom of said movable section.

To the shaft F is operatively connected an electric motor F', by means of which said shaft may be rotated in either direction in an obvious manner, so as to produce a corresponding lateral adjustment of the movable section E of the conduit.

At the free end of the movable section E of the conduit are provided laterally-extending wings E' E', arranged to extend sufficiently at the sides of the movable section to enable them to close the end of the compartment, which is out of register with the movable section of the conduit, in the manner shown in Fig. 1. These wings may be supported in any convenient or desired manner at opposite sides of the free end of the movable conduit section. It will be seen that when the movable section E is adjusted, so as to register with the branch conduit, the end of the continuation of the main conduit will be similarly closed by the wing E'. In said Fig. 1 I have illustrated in diagram suitable means for establishing electric circuits through the controlling-motor F' by means of an electric switch upon a car, so as to produce a desired adjustment of the movable section of the conduit. In said diagram the wires 1 1 lead from the respective conductors C C to the motor C', which propels the car. A second wire 2 leads to a suitable switch G, which is electrically connected by wire 3 with a second switch G', and the two switches G and G' are operatively connected together by a rod $g$, so that a movement of one of the switches in either direction will produce a corresponding movement of the other switch. Switch G is adapted for electrical contact with a contact-post $g'$, while the switch G' is arranged to similarly engage with a contact $g^2$, and it follows that by an adjustment of the connecting-rod $g$ in either direction said levers will be moved into position to alternately engage with said contact-posts. From the contact $g'$ a wire 5 leads to a contact strip or segment 6, while from the contact $g^2$ a wire 7 leads to a similar contact 8. Wires 9 and 10 lead, respectively, from the opposite poles of the armature of the motor to contact-strips 11 and 12, one pole of the fields of the motor being electrically connected with one of the conductors C by wire 13, and the other pole of the fields having an electrical connection by wire 14 with a contact-strip 15.

The contact-strips 6, 8, 11, 12, and 15 may be secured in any suitable or desired manner within the conduit, being, of course, insulated therefrom and from each other, and contact-springs H H' H$^2$ H$^3$ H$^4$ are arranged upon the contact carrier-arm, which extends into the conduit in any convenient manner, so as to respectively engage with the contact-strips 6, 8, 11, 12, and 15. Wires $h$ $h'$ $h^2$ $h^3$ $h^4$ lead, respectively, from the contact-springs, and wires $h^2$ and $h^3$ are electrically connected with the two levers I I of a double-pole switch upon the car, while wires $h$, $h'$, and $h^4$ lead, respectively, to contacts 16, 17, and 18, which are adapted for engagement by the levers I I of the switch. Supposing that the movable sections of the conduit and the switches G G are in the positions indicated in the drawings, and that it is desired to shift the movable section E out of register with the main line and into register with the branch line, the operator upon an advancing car will set the switch-levers I I so as to engage with two of the contacts—as, for instance, contacts 16 and 18. Current will now traverse the wire 2, switch-lever G, contact $g'$, wire 5, contact-strip 6, spring H, wire $h$, contact 16, lever I, wire $h^3$, spring H$^3$, contact-strip 12, and wire 10 to one pole of the armature, passing from the other pole of the armature through wire 9, contact-strip 11, spring H$^2$, and wire $h^2$ to the other contact-lever I, and thence from contact 18 along wire $h^4$, through spring H$^4$, contact-strip 15, and wire 14 to one pole of the field of the motor, and thence by wire 13 to the other conductor C. This will cause the motor to operate in one direction to rotate the shaft F, thereby serving to adjust the free end of the movable section to the right, so as to bring it into register with the branch conduit.

In order to cause the motor to stop when the desired degree of adjustment of the movable section of the conduit has been accomplished, I arrange the levers G G' to normally extend into the line of movement of the projections or wings E' E' at the end of the movable conduit section. This enables a desired one of said levers to be engaged by the projection E' on said movable section about the time when the limit of movement of the movable section E has been reached. By this arrangement, as the desired adjustment of the movable section of the conduit is about completed, the lever G will be engaged by the projection E' and thereby moved off from the contact $g'$, the lever G' being simultaneously moved into engagement with the contact $g^2$. The motor will thereby be cut out and the movement of the adjustable section of the conduit will cease, leaving it in operative engagement with the branch conduit. Now supposing that it is desired to adjust the movable section of the conduit in an opposite direction, so as to bring it into communication with the main line of the conduit, the operator upon the car adjusts the switch-levers I I into contact with contact-posts 17 and 18, in which condition of the parts current passes from the conductor C along wire 2, as before, from lever G to lever G', over wire 3, through lever G' to contact $g^2$, thence over wire 7 to contact-strip 8, through spring H' and wire $h'$ to contact 17, whence it passes through lever I, down wire $h^2$, through spring H$^2$ and contact 11 to wire 9, and thence through the armature of the motor in an opposite direction from that previously described, passing through wire 10, contact-strip 12, spring H$^3$, and wire $h^3$ to the other switch-lever I, and thence through contact 18, wire $h^4$, spring H$^4$, contact-strip 15, and wire 14 to the field-magnets, whence it returns, as before, by wire 13 to the other conductor C. This will obviously produce an adjustment of the movable section E in an opposite direction until the position shown in the drawings is reached, when the extension E' will come into engagement with the lever G' and move it out of contact with the post $g^2$, simultaneously adjusting the lever G into its engagement with the contact $g'$, so as to be ready for another operation of the adjusting mechanism. If desired, any suitable lever mechanism may be operatively connected with the movable section of the conduit—such, for instance, as the lever J, (shown in Fig. 1,) and connected by a link $j$ with the movable section E, whereby the switch-tongue or other movable device adjacent to the track may be simultaneously adjusted as the movable section E is moved into a desired position.

The particular lever mechanism shown in the drawings is pivoted at J' and has a slotted connection at its free end, as at $j'$, with the free end of a switch-tongue J². (Shown by the dotted lines.) The pivotal support J' for the lever J may be so adjusted as to give a desired degree of movement to the end of said lever, which is connected with the part to be adjusted, and it follows from the described construction that by the adjustment of the mechanism which moves the adjustable section of the conduit, so as to shift the latter to a desired position, the movable switch-tongue or other connected part will be adjusted simultaneously with the adjustment of the movable sections of the conduit, but in a direction opposite thereto.

In the particular form of construction illustrated in Fig. 2 of the drawings a movable table K is provided at the junction of the main and side or branch tracks, upon which table are arranged short sections K' and K² of the conduit, which sections are arranged, respectively, to register with the main and the branch or side tracks when the table is moved laterally. The particular device illustrated comprises three such sections mounted upon the table and a table arranged to be adjusted transversely with respect to the conduit, so as to bring either the center section K' into register with the main conduit, in order to permit cars upon the main track to continue thereon, or to bring either desired one of the branch sections of the conduit into register at one end with one part of the main conduit and the other end into register with one of the branch conduits. By this construction the movable sections of the conduit may be readily adjusted, so as to enable a car upon the track to pass onto the continuation of the main track or either desired one of the side or branch tracks.

The particular device illustrated in Fig. 3 comprises a pit or well L, located at the junction of two tracks, which cross at right angles, and within which pit or well a short section L' of the conduit is pivotally supported, as at $l$, at its central part and adapted to be swung upon said pivotal support, so as to come into register with either one of the conduits in an obvious manner, so as to permit contact devices carried by a car to pass freely through the adjustable section in either direction and into engagement with the continuation of a desired one of said conduits. Any desired means may be employed for effecting the adjustment of the movable section L' of the conduit—such, for instance, as indicated in the drawings—this particular device comprising a segmental gear $l'$, with which a rack-bar $l^2$ is arranged to mesh, and said rack-bar is operatively connected with a rod or pitman L², which may lead to any source of power. It follows from this construction that by a longitudinal movement of the rack-bar in either direction the segmental gear will be partially rotated, so as to bring the movable section of the conduit into register with one of the lines of the conduit, according to the direction of movement of said rack-bar.

The particular device illustrated in Fig. 4 comprises two lines of conduit intersecting each other at right angles, and the open ends of each line of conduit provided with means for normally closing the same, but adapted to open upon the approach of a car, so as to permit the free passage of the contact devices. As illustrated in Fig. 4, the two lines of conduit M M are arranged to communicate at their intersecting parts with a chamber or casing M' in the manner shown. In this particular form of construction no movable section of conduit is provided; but closing devices $m$ $m$ are arranged to normally close the open ends of the conduits where they communicate with the casing or chamber M'. Any suitable means may be provided for opening or closing the devices $m$ $m$—such, for instance, as the lever mechanism shown in Fig. 7, which comprises a bell-crank lever N, having a slotted connection at $n$ with the closing device $m$, and operatively connected by a connecting-rod or pitman $n'$, communicating with any suitable source of power. A longitudinal movement of the pitman $n'$ will obviously serve to raise or lower the closing device $m$ through the medium of the connecting bell-crank N. Similar devices may be applied to the open ends of the conduits in either the form of construction illustrated in Fig. 2 or Fig. 3.

The particular construction illustrated in Fig. 5 is designed more particularly for use in connection with a plurality of converging tracks, and comprises a suitable turn-table O, provided with a section O' of conduit, and the turn-table having a slot $o$ communicating therewith. The turn-table O is centrally supported in a familiar manner and is arranged to turn upon its support in such a manner as to bring the section O' of conduit in said table into register with any desired one of the converging tracks $o'$ $o'$. Any suitable means may be provided for rotating the turn-table O—such, for instance, as the worm P, meshing with the worm-wheel $p$, which latter is rigidly secured to the turn-table in an obvious manner. The shaft $p'$ of the worm P may communicate with any source of power—such, for instance, as an electric motor—by means of which said shaft may be rotated in either direction, and it follows from this construction that by a rotation of said worm the worm-gear $p$ will be rotated upon its axis, so as to carry the turn-table around and to thereby bring the section O' of the conduit into register with any desired one of the converging conduits.

The particular device illustrated in Fig. 6 comprises two converging conduits arranged to conform to converging lines of track and provided at their adjacent ends with closing devices $m$ $m$ similar to those before described. The adjacent ends of the conduits in this particular form of construction communicate with a casing P' in the manner shown. In this form of construction adjustable sections $p^2$ $p^2$ are provided upon the main line of the conductors and arranged to be moved alternately into register with the conductors leading to the continuation of the main conduit or those leading to the branch conduit.

By the arrangement of the closing devices $m\,m$ to normally close the ends of the intersecting conduits the admission of moist air is prevented, and these closing devices may be made to entirely cover the ends of said conduits or to close only the ends of the compartments containing the conductors. In order to enable a continuous circulation of air to be maintained throughout the conduit past the intersections of different lines thereof, I may provide suitable tubular connections S S, leading around the intersections of the lines of conduit and communicating with the compartments thereof containing the conductors at opposite sides of the junction. As a further improvement, if desired, a pipe or connection S' may be arranged to discharge air into the connections S S between the two lines of conduit, so as to create circulations or currents of air in the two lines of conduit in opposite directions.

I would have it understood that the electrically actuated adjusting devices shown in Fig. 1 and herein described may be applied to either of the other forms of adjustable conduit sections shown in the drawings, and that the closing devices for protecting the ends of the conduit sections may be applied to any or all of the different forms of construction shown in the drawings and herein described.

Other modifications in details of construction may also be made without departure from my orignal invention, and I do not desire to limit myself to the exact form or forms of devices shown in the drawings and herein described.

Having thus described my invention, what I claim as new, and desire to secure by Letters Patent of the United States, is—

1. The combination with a plurality of converging under ground conduits for electric conductors, of a movable conduit section provided with conductor sections, and adapted to be adjusted so as to register with and establish continuous communication between a desired pair of the ends of said converging conduits, and to bring said conductor sections into register with the conductors of a desired conduit, suitable electrically actuated mechanism operatively connected with said adjustable conduit section and adapted to adjust the same into a desired position, switch mechanism for starting, stopping and reversing said adjusting mechanism, and adapted for operative engagement with the adjustable conduit section, substantially as described.

2. The combination with a plurality of converging underground conduits for electric conductors of a movable conduit section, adapted to be adjusted so as to register with and establish a continuous communication between a desired pair of the ends of said converging conduits, suitable electrically actuated mechanism for adjusting said conduit section, and suitable switch mechanism adapted for engagement by said adjustable conduit section as it approaches the limit of its adjustment, so as to cut out the current from said actuating mechanism, substantially as described.

3. The combination with a plurality of converging underground conduits for electric conductors of suitable means for establishing continuous communication between a desired pair of the ends of said converging conduits, suitable means for closing the ends of the conduits which are not in communication, and suitable tubular connections communicating with said conduits at both sides of the junction thereof, and arranged to permit an air circulation past said junction, from one conduit to another, substantially as described.

In testimony whereof I sign this specification in the presence of two witnesses.

HERLUF A. F. PETERSEN.

Witnesses:
  JOHN E. WILES,
  M. M. WILES.